U S010785953B2

(12) United States Patent
Grüninger

(10) Patent No.: US 10,785,953 B2
(45) Date of Patent: *Sep. 29, 2020

(54) METHOD FOR HANDLING OF CHEESE BLOCKS

(71) Applicant: KALT MASCHINENBAU AG, Lütisburg (CH)

(72) Inventor: Siegfried Grüninger, St. Gallen (CH)

(73) Assignee: Kalt Maschinenbau AG, Lütisburg (CH)

( * ) Notice: Subject to any disclaimer, the term of this patent is extended or adjusted under 35 U.S.C. 154(b) by 228 days.

This patent is subject to a terminal disclaimer.

(21) Appl. No.: 15/344,770

(22) Filed: Nov. 7, 2016

(65) Prior Publication Data

US 2017/0135309 A1  May 18, 2017

(30) Foreign Application Priority Data

Nov. 13, 2015 (CH) ..................................... 1652/15

(51) Int. Cl.
*A01J 25/12* (2006.01)
*A23C 19/14* (2006.01)
*A01J 25/15* (2006.01)

(52) U.S. Cl.
CPC ............ *A01J 25/123* (2013.01); *A01J 25/15* (2013.01); *A23C 19/14* (2013.01); *A23V 2002/00* (2013.01)

(58) Field of Classification Search
CPC .......... A01J 25/123; A01J 25/13; A01J 25/15; A23C 19/00; A23C 2250/10
See application file for complete search history.

(56) References Cited

U.S. PATENT DOCUMENTS 913,889 A 3/1909 Hershiser
2,815,708 A 12/1957 Pauly
(Continued)

FOREIGN PATENT DOCUMENTS

BR 9300409 A 9/1993
CH 353573 A5 5/1961
(Continued)

OTHER PUBLICATIONS

European Search Report dated Feb. 2, 2017 for Patent Application No. 16194574.6-1358 (4 pages).
(Continued)

*Primary Examiner* — Erik Kashnikow
*Assistant Examiner* — Preston Smith
(74) *Attorney, Agent, or Firm* — Fleit Intellectual Property Law; Paul D. Bianco; Stephen Bongini

(57) ABSTRACT

A method and device for handling cheese blocks, which in particular can be assigned to a so-called cassette press with round or cornered cheese moulds. A rapid reloading of cheese blocks can be achieved. Compressed cheese curd is released from the inner wall of a mould and after a turning operation is evacuated from the mould, with the mould rotated, lowered and shaken or blown. Before the shaking or blowing, a pick-up plunger retracts into the mould up to the cheese block; the mould is then raised, rotated and guided back into the cheese press. The pick-up plunger with the cheese block is then lowered and the cheese block is fixed in position on the pick-up plunger by a clamping unit, is swivelled through 180° towards a secondary mould and is guided, i.e. pushed into the latter; the clamping unit is then opened and the pick-up plunger retracts.

13 Claims, 4 Drawing Sheets

(56) References Cited

U.S. PATENT DOCUMENTS

| | | | |
|---|---|---|---|
| 2,846,767 A | 8/1958 | Hensgen | |
| 2,942,983 A | 6/1960 | Sadler | |
| 3,192,626 A | 7/1965 | Boeuf | |
| 3,353,269 A | 11/1967 | Lambert | |
| 3,514,857 A | 6/1970 | Rossen | |
| 3,541,687 A | 11/1970 | Peters | |
| 3,615,587 A | 10/1971 | Koopmans | |
| 3,650,030 A | 3/1972 | Delamere | |
| 3,733,804 A | 5/1973 | Diersbock | |
| 3,748,072 A | 7/1973 | Whelan | |
| 3,783,166 A | 1/1974 | Peters | |
| 3,797,980 A | 3/1974 | Budahn | |
| 3,802,332 A | 4/1974 | Fassbender et al. | |
| 3,836,688 A | 9/1974 | Fischer | |
| 3,838,955 A | 10/1974 | Dubbeld | |
| 3,841,210 A | 10/1974 | Brog | |
| 3,973,042 A | 8/1976 | Kosikowski et al. | |
| 4,049,838 A | 9/1977 | Krueger et al. | |
| 4,068,014 A * | 1/1978 | Heimbruch | A01J 25/167 |
| | | | 426/512 |
| 4,268,528 A | 5/1981 | Montigny | |
| 4,318,684 A * | 3/1982 | Boucher | A23G 3/0284 |
| | | | 425/437 |
| 4,418,616 A | 12/1983 | Streeter et al. | |
| 4,440,073 A | 4/1984 | Quilliou | |
| 4,472,339 A | 9/1984 | van der Ploeg et al. | |
| 4,509,413 A | 4/1985 | Granberg et al. | |
| 4,515,815 A | 5/1985 | Kosikowski | |
| 4,750,415 A | 6/1988 | Ostemar | |
| 4,817,515 A | 4/1989 | Bjerre et al. | |
| 5,052,290 A | 10/1991 | Nielsen | |
| 5,082,681 A * | 1/1992 | Barlow | A01J 25/12 |
| | | | 425/311 |
| 5,206,496 A | 4/1993 | Clement et al. | |
| 5,794,779 A | 8/1998 | Weinheimer et al. | |
| 5,974,779 A | 11/1999 | Orscheln et al. | |
| 6,026,737 A | 2/2000 | D'Alterio et al. | |
| 6,465,033 B2 | 10/2002 | Menninga et al. | |
| 6,912,949 B2 | 7/2005 | Brizio | |
| 7,757,876 B1 | 7/2010 | Diller | |
| 8,322,535 B2 | 12/2012 | Shoham et al. | |
| 8,512,792 B2 | 8/2013 | Spijkerman | |
| 8,916,221 B2 | 12/2014 | Waldburger | |
| 9,049,837 B2 | 6/2015 | Waldburger | |
| 9,713,314 B2 | 7/2017 | Waldburger | |
| 9,968,070 B2 | 5/2018 | Waldburger | |
| 2007/0196537 A1* | 8/2007 | Winkler | A01J 25/123 |
| | | | 426/36 |
| 2008/0036112 A1 | 2/2008 | Gilg | |
| 2010/0239730 A1 | 9/2010 | Ditter | |
| 2010/0263551 A1 | 10/2010 | Pavero | |
| 2014/0087014 A1* | 3/2014 | Waldburger | A01J 25/13 |
| | | | 425/84 |
| 2014/0087045 A1* | 3/2014 | Waldburger | A01J 25/13 |
| | | | 426/478 |
| 2015/0320007 A1 | 11/2015 | Hamm et al. | |
| 2017/0135309 A1 | 5/2017 | Gruninger | |
| 2017/0135310 A1 | 5/2017 | Gruninger | |
| 2017/0303498 A1 | 10/2017 | Kong | |
| 2019/0191659 A1 | 6/2019 | Waldburger | |

FOREIGN PATENT DOCUMENTS

| | | |
|---|---|---|
| CH | 563142 | 2/1972 |
| CH | 573142 B5 | 9/1972 |
| CH | 704208 A2 | 6/2012 |
| CH | 706999 | 3/2014 |
| CH | 706999 A1 | 3/2014 |
| CH | 707000 A1 | 3/2014 |
| DE | 821572 C | 7/1949 |
| DE | 878577 C | 6/1953 |
| DE | 922448 C | 1/1955 |
| DE | 1030612 B | 5/1958 |
| DE | 1582967 A1 | 7/1970 |
| DE | 2823182 A1 | 12/1978 |
| DE | 2950497 A1 | 6/1981 |
| DE | 3529895 A1 | 2/1987 |
| DE | 19613068 A1 | 10/1997 |
| DE | 29812845 U1 | 12/1998 |
| EP | 922448 C | 1/1955 |
| EP | 0126861 A1 | 3/1984 |
| EP | 0350777 A1 | 1/1990 |
| EP | 0406899 A1 | 1/1991 |
| EP | 0543185 A1 | 5/1993 |
| EP | 0543899 A1 | 6/1993 |
| EP | 0543185 B1 | 9/1995 |
| EP | 0922448 A2 | 6/1999 |
| EP | 1269832 A1 | 1/2003 |
| EP | 1269832 B1 | 10/2004 |
| EP | 1769676 A1 | 4/2007 |
| EP | 2710888 A1 | 3/2014 |
| EP | 2710889 A1 | 3/2014 |
| EP | 3167709 A1 | 5/2017 |
| EP | 3167709 B1 | 12/2018 |
| FR | 2146532 A5 | 3/1973 |
| FR | 2462253 A5 | 2/1981 |
| FR | 2473840 A1 | 7/1981 |
| FR | 2527421 A1 | 12/1983 |
| FR | 2919467 A1 | 2/2009 |
| FR | 2981827 A1 | 5/2013 |
| GB | 951746 A | 3/1964 |
| GB | 1054727 A2 | 1/1967 |
| GB | 2065487 A | 7/1981 |
| NL | 8402355 A | 2/1986 |
| WO | 1992/03297 A1 | 3/1992 |
| WO | 2004/087513 A1 | 10/2004 |
| WO | 2013/051950 A1 | 4/2013 |

OTHER PUBLICATIONS

Derwent abstract for SU876084, published Oct. 1981, 2 pages 002.
European Search Report issued for Application No. 13183880.7, dated Feb. 4, 2014, 6 pages 002.
University of Montana, Agricultural Experiment Station Circular #1, 1910; dated Jul. 22, 1939 002.
European Search Report issued for Application No. 14181770, dated Feb. 9, 2015 (wth machine translation) 004.
Google search results for "Considur fine hole trangular", retrieved Oct. 24, 20106 showing article entitled Belts With Interlaced Bards, Welded Wedge Wire Screens From Hein, www.hellotrade.com, 1 page, shown publication date Apr. 29, 2013 004.
Webpage from Hein Lehrmann website, Considur fine hole sheets, 1 page, retrieved Oct. 24, 2016, publication date prior to Jan 1, 2013 004.
European Search Report issued for Application No. 15158045, dated Jul. 14, 2015, 3 pages 005.
European Search Report issued for Application No. 16194574, dated Feb. 14, 2017, 4 pages 009.
European Search Report issued for Application No. 16195210.6, dated Mar. 27, 2017, 3 pages 010.
European Search Report issued for Application No. 17165041, dated Sep. 7, 2017, 2 pages 011.
For U.S. Appl. No. 15/344,909: (010) Office Actions dated Jan. 24, 2018; Jul. 24, 2018; Feb. 21, 2019; Sep. 25, 2019 Responses dated Mar. 26, 2018; Oct. 24, 2018; May 21, 2019.
For U.S. Appl. No. 15/486,464: (011) Office Action dated Sep. 25, 2019.
For U.S. Appl. No. 15/344,909: (010) Response filed Dec. 25, 2019.

* cited by examiner

METHOD FOR HANDLING OF CHEESE BLOCKS

FIELD OF THE INVENTION

The invention relates to a method for purposes of handling cheese blocks and a device for this purpose, which in particular can be assigned to a so-called cassette press with round or cornered cheese moulds.

BACKGROUND

A device for the industrial production of cheese blocks is of known art from e.g. EP-A-350777. This comprises a cheese press with a rectangular pan, open above, for the accommodation of moulds, a column frame for purposes of arranging a press head that can be raised and lowered, and a distribution head for purposes of supplying and metering the cheese curd into the moulds, and a portal carriage that can be traversed on the pan for purposes of guiding the distribution head and for purposes of handling a turning mechanism for the moulds. Here the distribution head and the turning mechanism must be manually prepared, that is to say, changed over. EP-A-406899 shows a further development of such a device in which the moulds are accommodated in cassettes, which in turn are arranged compactly in the form of rows in the pan. Above the moulds is provided a press head with compression rams aligned with the moulds for purposes of compressing the cheese curd. The cassettes have an edge design minimising clearance and a mechanised device is provided for purposes of moving the cassettes. Moreover, a tray can be assigned to the pan for second moulds, into which the immature compressed cheese blocks are reloaded (EP-A-1769676). The moulds can be supplied by means of a roller conveyor of an appropriate handling device of the press to a further work section.

In accordance with EP-B-543185 a mould cover can be connected via a tilting device with the compression ram (in a self-centring manner) so that by virtue of possible tilting movements any suction of the mould cover onto the cheese mass is avoided. The mould itself is round or rectangular and can consist of an outer container and an inner perforated casing.

The compressed cheese blocks can, for example, be removed from the mould by means of a gripper, wherein air is blown into the press mould beforehand in order to release the cheese block from the mould wall (EP-B-1269832 or DE-B-922448).

Contact of the cheese block with the air or other gases that are blown in can represent a hygiene problem. In order to avoid this attempts have also been made to remove the cheese block from the press mould by means of vacuum grippers. However, this leads to the formation of stubs, or in general to damage of the surface, or even to tearing of the cheese.

A further cassette press of this type is published in CH704208A2 and EP2710888A1. The cassette press in accordance with CH704208A2 has two handling devices, wherein the second handling device, which can be traversed along the longitudinal sides of the pan, interacts with a turning unit.

EP2710888A1 discloses a cassette press that is provided with a shaker, which is assigned to a horizontally arranged tray or conveyor for the compressed cheese block.

SUMMARY

Disclosed is a method for the automatic handling of cheese blocks, with which in particular a protective, rapid and precise removal of the cheese block from a primary mould and placement in a secondary mould can be achieved.

In accordance with at least some embodiments of the invention there takes place:

a) an operation of shaking or blowing onto a cheese curd compressed in a mould, wherein the mould, that is to say, a cassette with the moulds therein arranged, is rotated and lowered beforehand, and a pick-up plunger retracts into the mould up to the cheese block, wherein after the shaking operation the pick-up plunger extends out of the mould, and the latter is rotated back into its initial position, b) accordingly the mould, without the cheese block, which is lying on the pick-up plunger, is raised, rotated through 180°, and guided back into the cheese press, in particular a cassette press, c) the pick-up plunger, with the cheese block lying on it, is now lowered, and d) the cheese block is fixed in position on the pick-up plunger by means of a clamping unit, e) so that the cheese block can be swivelled through 180° towards a secondary mould, and can be guided into the latter, and then f) the clamping unit is opened and the pick-up plunger can be extended (or the pick-up plunger firstly extends).

The release of the cheese block, that is to say, the cheese curd, from the inner wall of the mould takes place by means of a shaking operation, or also a blowing operation on the compressed cheese block, immediately, that is to say, directly before removal from the mould. The shaking movement is introduced immediately after the operation of turning the mould, such that each cheese block can then lie on a pick-up plunger.

Other features are also disclosed.

The shaking operation takes place only briefly and at least once. The shaking movement can take place horizontally or vertically. The mould is thereby preferably lowered into a shaker.

Each cheese block is pushed with the pick-up plunger into the secondary mould and the swivelling of the cheese block preferably takes place with a swivelling gripper or a turning gripper. Here the swivelling or turning gripper, after the retraction of the pick-up plunger, rotates through 180° back into its initial position.

The cheese blocks are not only protectively but also hygienically removed from the mould and transported onwards.

Also disclosed is a device for the handling of cheese blocks, which enables a rapid reloading of cheese blocks.

Preferred forms of embodiment are disclosed as well.

The inventive device is of compact construction and enables automated handling and in particular gripping of the cheese block, and thus a rapid repopulation of the cassette press, since the cheese must only spend a short time in the moulds.

BRIEF DESCRIPTION OF THE DRAWINGS

In what follows an example of embodiment of the invention is described in more detail with the aid of figures. In the figures.

DETAILED DESCRIPTION

Figure 1:
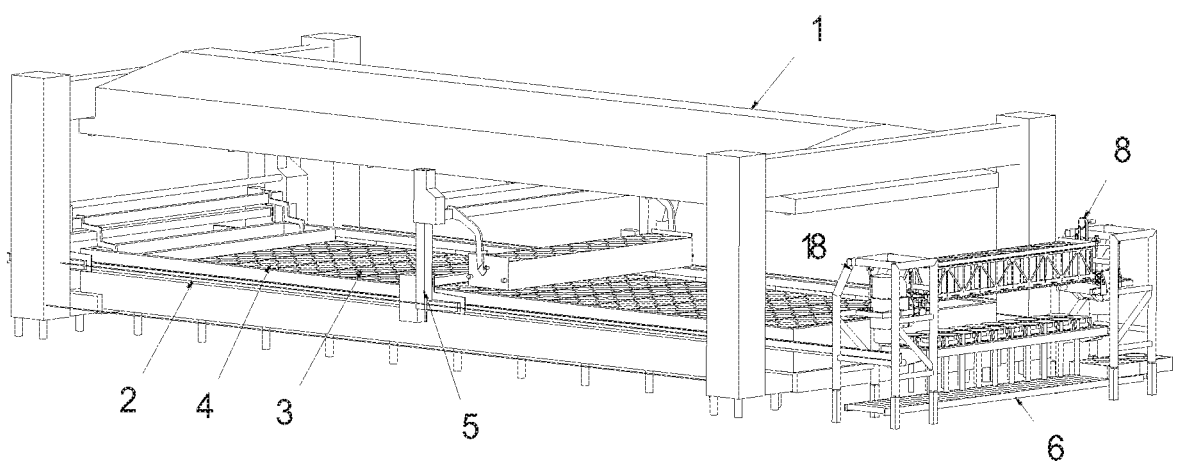
FIG. 1 shows a cassette press in a partial view.

A cassette press 1 for purposes of compressing a cheese curd so as to reduce the fluid content, taking into account the disclosures of CH-A-704208 A and/or CH 706999 A, comprises:
- a pan 2 that is rectangular in plan view and open upwards (FIG. 1), with cassettes 3 that are rectangular in plan view and open upwards; the latter are arranged side-by-side in rows transverse to the longitudinal direction of the pan 2,
- moulds 4 for purposes of accommodating the cheese curd to be compressed, which are arranged in the cassettes 3, wherein a mould 4 can be a part of the cassette 3 and has at least one floor and one casing, with at least one outlet for the fluid that is to be pressed out,
- on the upper edges, which form the outer sides of the cassette block in the pan 2 in the longitudinal and transverse directions, edge plates with a height of several centimetres can be arranged, to enable the cheese curd to be floated in (e.g. by means of a pipe distributor, or other means), up to above the upper edge of the cassette,
- a press head, mounted on end columns, with a multiplicity of compression rams, aligned with the moulds 4, and not explicitly represented, for purposes of compressing the cheese curd, designed e.g. in accordance with the disclosure of EP-B-543899, together with a hold-down device for purposes of releasing the press head from the cassettes 3,
- a pipe distribution system, that is to say, a filling apparatus, for purposes of floating in the cheese curd,
- at least one handling unit 5, which, driven by a motor, can be traversed along the longitudinal sides of the pan 2 for purposes of raising, traversing and handling a cassette 3 outside the pan 2 in particular also from and to a device 18 for purposes of removal from a mould, or placement in a mould, on the end face of the pan edge (FIG. 1).

An inventive device 18 for purposes of handling the cheese block K is assigned to the cassette press 1; this has a device for purposes of rotating/turning the cassette 3 about its longitudinal axis (turning unit 8) and it is moreover provided with a shaker 7 arranged near to the turning unit 8. It also comprises a conveyor track 6 for secondary moulds 14.

The device 18 moreover comprises a swivelling or turning gripper assigned to the conveyor track 6, mounted such that it can swivel, which is provided with at least one pick-up plunger 16 and devices for purposes of clamping the cheese blocks K.

Figure 2:
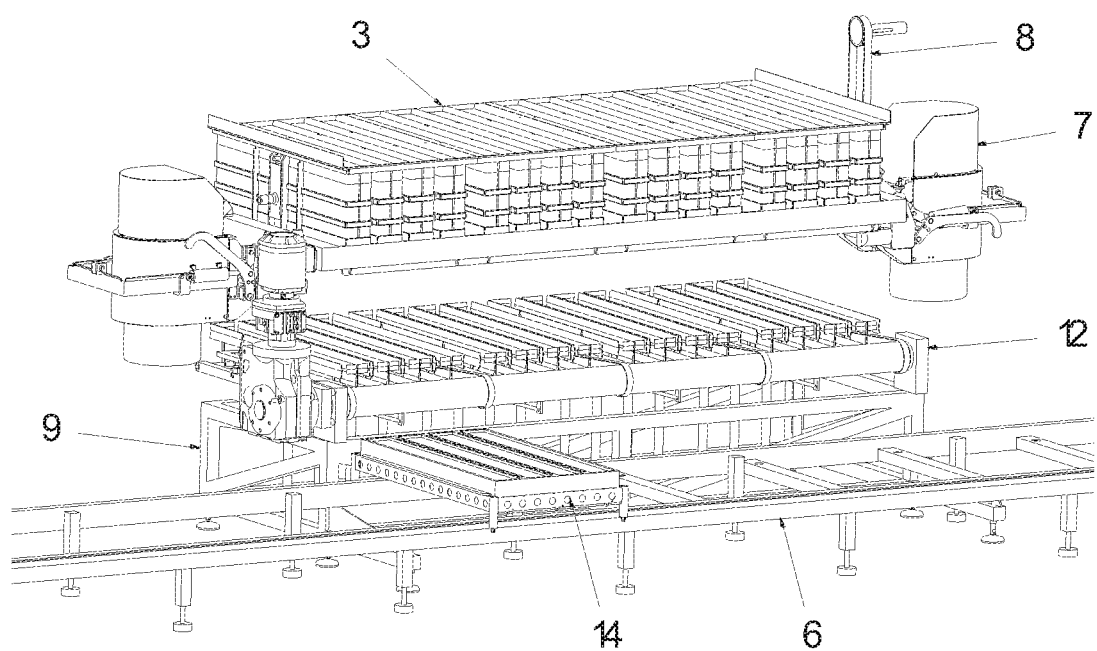
FIG. 2 shows the inventive device with a swivelling gripper.

The device 18 for purposes of handling the cheese blocks K, with a swivelling gripper 12 in accordance with FIG. 2, comprises a frame 9 for purposes of accommodating the shaker 7 and the turning unit 8. It also has a pick-up plunger 16 for each mould 4.

The handling unit 5 enables the raising and lowering of the cassettes 3 in the cassette press 1.

The swivelling gripper 12 with a swivel arm is arranged, mounted such that it can rotate, in the frame 9 between the conveyor track 6 and the shaker 7. The swivel arm of the swivelling gripper 12 can be swivelled with the clamping frame 10 and the therein attached clamping jaws 11 about an axis of rotation 17.

A conveyor track 6 is assigned to the device 18.

Figure 3:
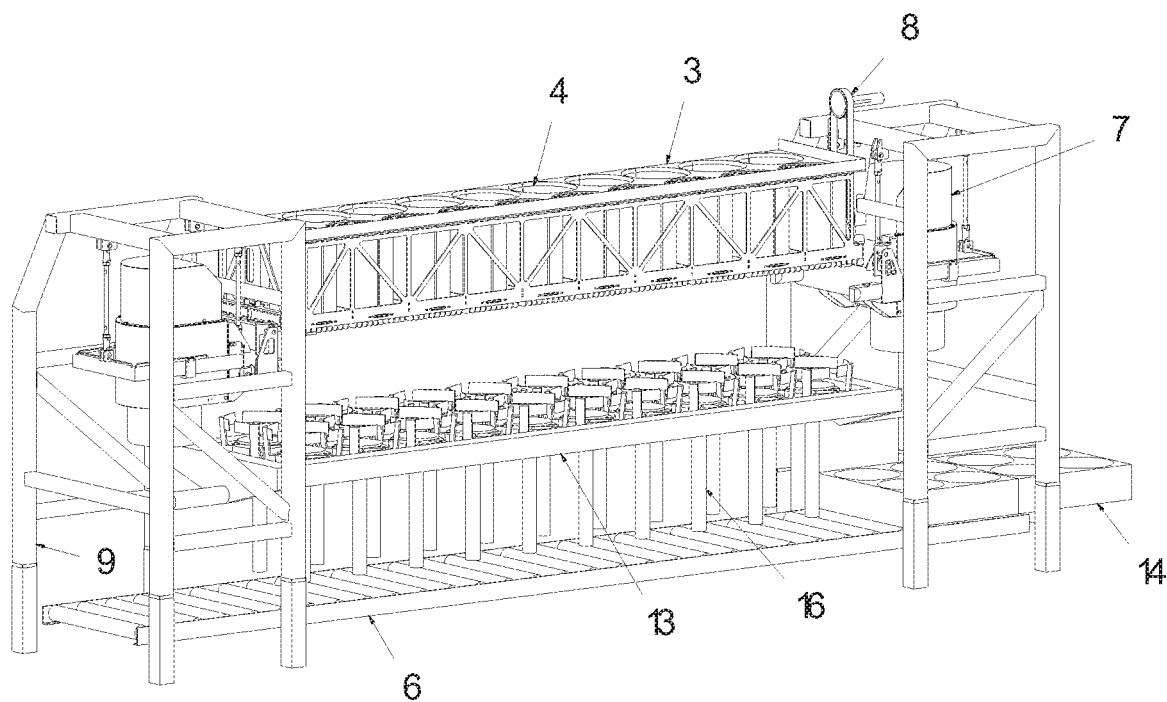
FIG. 3 shows the inventive device with a turning gripper.

Compared with the swivelling gripper 12, the device 18 for purposes of handling the cheese block K, with a turning gripper 13 in accordance with FIG. 3, requires a larger separation between the axis of rotation 17 of the gripper and the conveyor track 6, and comprises a frame 9 for purposes of accommodating the shaker 7 and the turning unit 8, wherein the cassette 3 that is to be handled is lowered into the shaker 7. The turning gripper 13 is arranged, mounted such that it can rotate, in the frame 9 between the conveyor track 6 and the cassette 3 that is to be lowered. The turning gripper 13 can be swivelled about an axis of rotation 17.

The cheese blocks K can be pressed into the secondary moulds 14 with the pick-up plunger 16.

The secondary moulds 14 with the conveyor track 6 are arranged underneath the turning gripper 13 in the frame 9 and in the forms of embodiment with turning grippers 13 and swivelling grippers 12 are as a general rule conveyed in parallel.

Swivelling or turning grippers 12, 13 are preferably provided with a geared motor in particular a bevel gear-geared motor.

Figure 4:
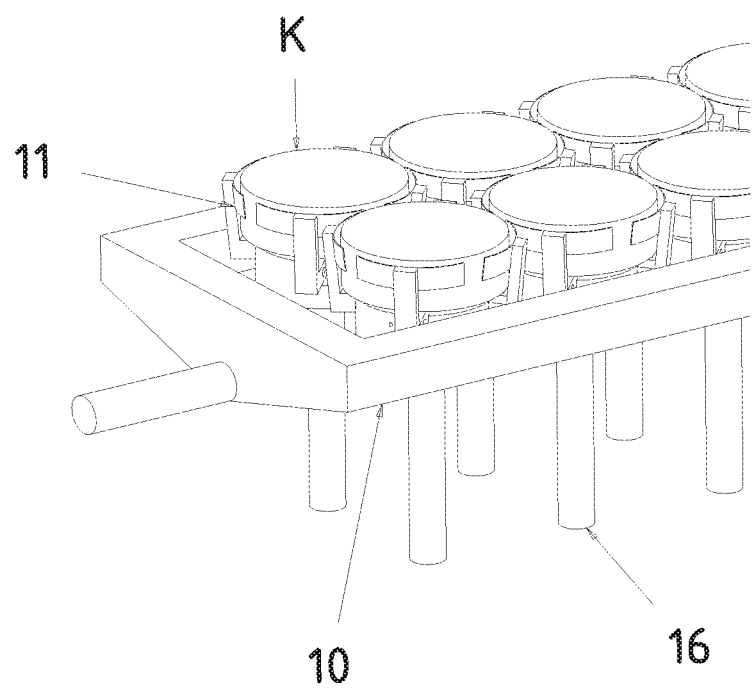
FIG. 4 shows a clamping beam of the inventive device with a turning gripper.

The device 18 also comprises means for purposes of clamping the cheese block K, preferably clamping jaws 11, which can be arranged in a clamping beam 10. The clamping jaws 11 are preferably actuated collectively via the clamping beam 10 (FIG. 4).

The pick-up plunger 16 and the clamping jaws 11 can preferably be actuated pneumatically.

For purposes of executing the evacuation of the moulds 4 of a cassette 3 and the relocation of the cheese blocks K by means of swivelling grippers 12 (FIG. 2) the cheese curd that has been compressed into cheese blocks K is released by means of shaking or air from the inner wall of the mould 4, and after a turning operation is evacuated from the mould 4. For this purpose the cassette 3 with the moulds 4 is rotated above the swivelling gripper 12 and lowered in the direction of the pick-up plunger 16. One pick-up plunger 16 retracts into each mould 4 of the cassette 3, located at a small distance from the cheese block K, that is to say, it extends out of the device 18, and the shaking operation is executed. Or the cheese is released from the mould wall by blowing in air.

Only after the shaking or blowing operation does the cheese block lie directly on the pick-up plunger 16.

After the shaking operation the mould 4, that is to say, the cassette 3 with the moulds 4, is raised, again rotated through 180° into its initial position, and in its evacuated state is guided back into the cassette press 1.

The pick-up plunger 16, together with the cheese block K lying on it, is now lowered and each cheese block K is fixed by means of the assigned clamping jaw 11 in position on the pick-up plunger, so that the cheese block K is swivelled by means of the swivelling gripper 12 through 180° towards a secondary mould 14 and is pushed into the latter.

The clamping jaws 11 are then opened once again, the pick-up plungers 16 are retracted, and the clamping jaws 11 swivel with the swivelling gripper 12 back into their initial position.

The filled secondary moulds 14 are traversed on the conveyor track 6 to another workstation and empty secondary moulds 14 are prepared.

For purposes of executing the evacuation of the moulds 4 and the relocation of the cheese block K by means of turning grippers 13 (FIG. 3), the cheese curd that has been compressed into cheese blocks K is similarly evacuated from the mould 4 after a turning operation. For this purpose the cassette 3 is rotated above the turning gripper 13 and is lowered in the direction of the pick-up plunger 16. One pick-up plunger 16 retracts into each mould 4 of the cassette 3 until it is located on the cheese block K, that is to say, it extends out of the device 18, and the shaking or blowing operation is executed.

After the shaking or blowing operation the mould 4, that is to say, the cassette 3 with the moulds 4, is raised, again rotated through 180° into its initial position, and in its evacuated state is guided back into the cassette press 1. The pick-up plunger 16, together with the cheese block K lying on it, is now lowered and each cheese block K is fixed in position by means of the assigned clamping jaws 11, so that each cheese block K is rotated in the turning gripper 13 through 180° towards a secondary mould 14, and by means of the pick-up plunger 16 is pushed into the latter.

The clamping jaws 11 are then opened once again, the pick-up plunger 16 is retracted, and the clamping jaws rotate with the turning gripper 13 again through 180° back into their initial position.

The shaking movement is preferably executed horizontally and takes place at least once, wherein after the shaking or blowing operation the cheese block K can be removed from the mould 4.

Both in the device 18 and also in the secondary moulds 14, the cheese blocks K are located in a defined manner, and no manual access is necessary.

Figure 5:
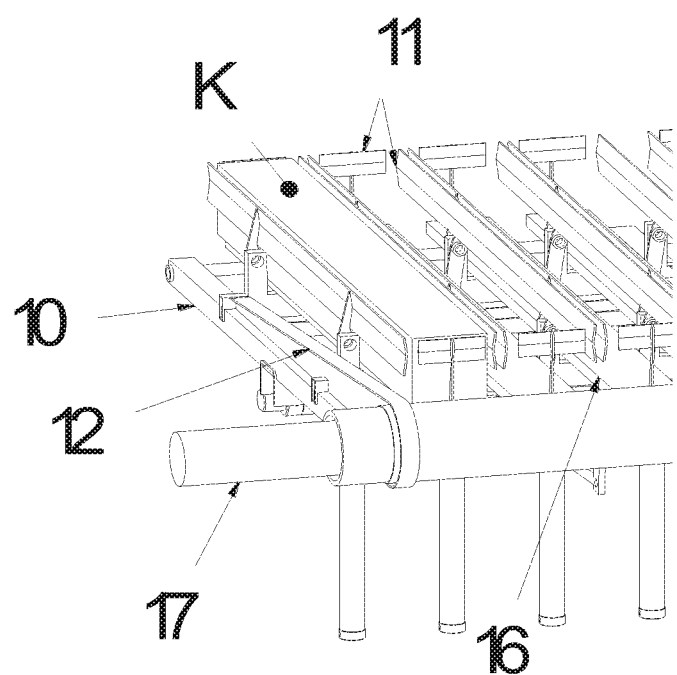
FIG. 5 shows a clamping beam of the inventive device with a swivelling gripper.

A swivelling gripper 12 can also be employed for the handling of very long and narrow cheese blocks K (FIG. 5). In principle, however, swivelling and turning grippers 12, 13 can be employed for all shapes of cheese.

The terms "retraction" and "extension" are always used with reference to function, and not with reference to the ram.

REFERENCE LIST

1 Cassette press
2 Pan
3 Cassette
4 Mould
5 Handling equipment
6 Conveyor track
7 Shaker
8 Turning unit
9 Frame
10 Clamping beam
11 Clamping jaw
12 Swivelling gripper
13 Turning gripper
14 Secondary mould
15 Ejector
16 Pick-up plunger (ejector)
17 Axis of rotation
18 Device
K Cheese block

What is claimed is:

1. A method for handling a plurality of cheese blocks that have beforehand been pressed out of a cheese curd into a corresponding plurality of moulds of a cassette press, the moulds being arranged in a cassette, the method comprising:
   performing an operation of shaking or blowing the cheese curd compressed in the moulds so that the compressed cheese curd is released from an inner wall of the moulds,
   wherein before the shaking or blowing operation:
   a) the cassette containing the moulds is rotated and lowered, and
   b) for each of the moulds in the cassette, a pick-up plunger retracts into the mould up to the cheese block, and
   after the shaking or blowing operation:
   c) for each of the moulds in the cassette, a pick-up plunger extends out of the mould with the cheese block lying on the pick-up plunger,
   d) the cassette containing the moulds is raised, rotated into the initial position, and guided back into the cassette press, and
   e) for each of the cheese blocks that was in the cassette:
      e1) the pick-up plunger with the cheese block is lowered,
      e2) the cheese block is fixed in position on the pick-up plunger by a clamping unit,
      e3) the cheese block is swivelled or rotated through 180° towards a secondary mould, and is guided into the secondary mould, and
      e4) after the cheese block is guided into the secondary mould, the clamping unit is opened and the pick-up plunger is retracted.

2. The method in accordance with claim 1, wherein in step b), the pick-up plunger retracts into the mould so as to be located a small distance from the cheese block.

3. The method in accordance with claim 1, wherein in step b), the pick-up plunger retracts into the mould so as to be located on the cheese block.

4. The method in accordance with claim 1, wherein the shaking or blowing operation includes shaking and blowing.

5. The method in accordance with claim 1, wherein the swivelling or rotating of the cheese block in step e3) is rotating of the cheese block performed by a turning gripper.

6. The method in accordance with claim 5, wherein after the retraction of the pick-up plunger in step e4), the turning gripper rotates through 180° into its initial position.

7. The method in accordance with claim 1, wherein the shaking or blowing operation includes shaking, the shaking movement being executed horizontally or vertically, and taking place at least once.

8. The method in accordance with claim 1, wherein the cheese block is shaken or blown out of the mould.

9. The method in accordance with claim 1, wherein in step e3), the cheese block is pushed into the secondary mould by the pick-up plunger.

10. The method in accordance with claim 1, wherein the swivelling or rotating of the cheese block in step e3) is swivelling of the cheese block performed by a swivelling gripper.

11. The method in accordance with claim 10, wherein after the retraction of the pick-up plunger in step e4), the swivelling gripper returns to its initial position.

12. The method in accordance with claim 1, wherein in step a), the moulds are lowered into a shaker.

13. A method for handling a plurality of cheese blocks that have been pressed out of a cheese curd into a corresponding plurality of moulds of a cassette press, the moulds being arranged in a cassette, the method comprising:
   rotating and lowering the cassette containing the moulds;
   after the rotating and lowering of the cassette, retracting a pick-up plunger into each of the moulds in the cassette up to the cheese block;
   after the retracting of the pick-up plungers, performing an operation of shaking or blowing the cheese curd compressed in the moulds to release the compressed cheese curd from the moulds such that, for each of the moulds in the cassette, the cheese block lies on the pick-up plunger;

after the performing of the shaking or blowing operation, raising the cassette containing the moulds, rotating it, and guiding it back into the cassette press; and after the performing of the shaking or blowing operation, for each of the cheese blocks that was in the cassette:

lowering the pick-up plunger with the cheese block, closing a clamping unit to fix the cheese block in position on the pick-up plunger, swivelling or rotating the cheese block through 180° towards a secondary mould, pushing the cheese block into the secondary mould with the pick-up plunger, and after the pushing of the cheese block into the secondary mould, opening the clamping unit and raising the pick-up plunger.

* * * * *